(12) United States Patent
Frait et al.

(10) Patent No.: US 7,828,128 B2
(45) Date of Patent: Nov. 9, 2010

(54) CONTROL OF FLUID PRESSURE IN A TORQUE CONVERTER OF AN AUTOMATIC TRANSMISSION

(75) Inventors: Steven A. Frait, Milan, MI (US); Dennis W. Person, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 539 days.

(21) Appl. No.: 11/947,281

(22) Filed: Nov. 29, 2007

(65) Prior Publication Data

US 2009/0139815 A1 Jun. 4, 2009

(51) Int. Cl.
*F16H 61/14* (2006.01)

(52) U.S. Cl. ..................... 192/3.3; 192/85.63

(58) Field of Classification Search ........................ None
See application file for complete search history.

(56) References Cited

U.S. PATENT DOCUMENTS

| | | | |
|---|---|---|---|
| 3,592,083 A | 7/1971 | Kawabata et al. | |
| 4,565,267 A | 1/1986 | Nishikawa et al. | |
| 4,597,482 A | 7/1986 | Sakurai et al. | |
| 4,660,690 A | 4/1987 | Nishikawa et al. | |
| 4,693,347 A | 9/1987 | Nishikawa et al. | |
| 4,700,819 A | 10/1987 | Nishikawa et al. | |
| 4,729,461 A | 3/1988 | Nishikawa et al. | |
| 4,760,761 A | 8/1988 | Nishikawa et al. | |
| 4,768,632 A | 9/1988 | Moan | |
| 5,113,984 A * | 5/1992 | Benford | 192/3.3 |
| 6,374,973 B1 * | 4/2002 | Nobu et al. | 192/3.3 |
| 6,668,978 B2 | 12/2003 | Fessler et al. | |
| 6,695,111 B1 | 2/2004 | Bai | |
| 6,832,671 B1 | 12/2004 | Stafford | |
| 6,848,548 B2 | 2/2005 | Alfredsson | |
| 7,104,273 B1 | 9/2006 | Stafford | |
| 2001/0019984 A1 | 9/2001 | Nakano et al. | |
| 2007/0187205 A1 * | 8/2007 | Gierer et al. | 192/3.29 |

* cited by examiner

*Primary Examiner*—Rodney H Bonck
(74) *Attorney, Agent, or Firm*—David B. Kelley; MacMillan, Sobanski & Todd, LLC

(57) ABSTRACT

A system for controlling hydraulic fluid supplied to a torque converter of an transmission includes a torque converter including a chamber containing an impeller and a turbine, and a bypass clutch having a variable torque capacity, a source of variable control pressure, a latch valve changes in response to the variable control pressure alternately between an unlatched state, wherein the latch valve produces a low pressure output, and a latched state, wherein the latch valve produces a high pressure output, a first valve for limiting hydraulic pressure in the chamber alternately at two magnitudes of pressure in response to the low pressure output and the high pressure output, and a second valve responsive to the variable control pressure for regulating a magnitude of hydraulic pressure that actuates the bypass clutch and changes the torque capacity of the clutch.

20 Claims, 2 Drawing Sheets

CONTROL OF FLUID PRESSURE IN A TORQUE CONVERTER OF AN AUTOMATIC TRANSMISSION

BACKGROUND OF THE INVENTION

1. Field of the Invention

This invention relates generally to a torque converter for an automatic transmission, and, in particular, to a hydraulic system that supplies oil to the converter, actuates an impeller clutch of the torque converter and provides a continuous supply of hydraulic lubricant to transmission components.

2. Description of the Prior Art

A torque converter is a modified form of a hydrodynamic fluid coupling, and like a fluid coupling, is used to transfer rotating power from a prime mover, such as an internal combustion engine or electric motor, to a rotating driven load. A torque converter is able to multiply torque when there is a substantial difference between input and output rotational speed, thus providing the equivalent of a reduction gear.

A torque converter includes at least three rotating elements: an impeller, which is mechanically driven by the prime mover; a turbine, which drives the load; and a stator, which is interposed between the impeller and turbine so that it can alter oil flow returning from the turbine to the impeller to multiply torque. The stator is mounted on an overrunning clutch, which prevents the stator from counter-rotating the prime mover but allows for forward rotation. The torque converter is encased in a housing, which contains automatic transmission fluid (ATF), sometimes referred to as "oil," "lube" or "lubricant."

Hydrodynamic parasitic losses within the torque converter reduce efficiency and generate waste heat. In modern automotive applications, this problem is commonly avoided by use of a bypass clutch (also called lock-up clutch), which physically links the impeller and turbine, effectively changing the converter into a purely mechanical coupling. The result is no slippage, virtually no power loss and improved fuel economy.

Torque converter clutch designs include two basic types, a closed piston design and an open piston design. A closed piston design requires a dedicated hydraulic circuit into the torque converter, which communicates only with the apply side of the clutch piston. When pressure is high, the clutch applies. When pressure is low, the clutch releases. A more uncommon form is to have this circuit on the release side where high pressure releases the clutch and low pressure applies the clutch.

When the torque converter is multiplying torque, power loss occurs which significantly increases the temperature of ATF in the torque converter and must be cooled before returning to the transmission. Cooler return oil is usually routed into the transmission lubrication circuit to cool internal clutches, gear sets and bearings. The lubrication circuit is also used to fill or charge balance dams, which are intended to keep disengaged clutch pistons from drifting on when internal rotational speeds increase.

Hydraulic system logic that controls a torque converter is responsible for several functions including: 1) supplying the converter with sufficient pressure to keep the converter from cavitating, 2) flowing sufficient oil through the converter to remove heat generated in the torus and clutch, 3) controlling pressure in the lock-up clutch piston, 4) supplying oil to the cooling and lube circuits, and 5) minimizing system pump demand for flow and pressure when not required. Many controls systems do not properly control all of these functions A need in the industry exists to control a closed piston torque converter bypass clutch using a simple valve arrangement, that improves clutch control, reduces converter flow demands without introducing risk to the transmission lubrication system.

SUMMARY OF THE INVENTION

A system for controlling hydraulic fluid supplied to a torque converter of an transmission includes a torque converter including a chamber containing an impeller and a turbine, and a bypass clutch having a variable torque capacity, a source of variable control pressure, a latch valve changes in response to the variable control pressure alternately between an unlatched state, wherein the latch valve produces a low pressure output, and a latched state, wherein the latch valve produces a high pressure output, a first valve for limiting hydraulic pressure in the chamber alternately at two magnitudes of pressure in response to the low pressure output and the high pressure output, and a second valve responsive to the variable control pressure for regulating a magnitude of hydraulic pressure that actuates the bypass clutch and changes the torque capacity of the clutch.

The system includes only two regulator valves instead of three to control converter charge pressure, converter clutch pressure and cooler/lube control, thereby reducing the probability of interactions among the regulators, regulator instability, regulator sticking and pressure variability.

The system also allows for independent and adjustable flows for the converter circuit, cooler circuit and the lube circuit.

Conventional two-pass and three pass converters send the locked converter oil flow directly to the transmission oil sump. This system saves this oil by sending it a transmission oil cooler and transmission lube circuit, effectively saving energy that would otherwise be required to pump a larger oil volume, allows for lower lug limits, and saves fuel. The flow rate is about two liters per minute in an automatic transmission operating in sixth gear at 1000 rpm, which results in a 33 percent reduction in oil flow to the converter, cooler and lube circuits during lock-up.

The system allows tuning of oil flow to the cooler and lube circuits when the converter clutch is locked, hard-locked or modulating torque transmitted between the converter's impeller and turbine.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
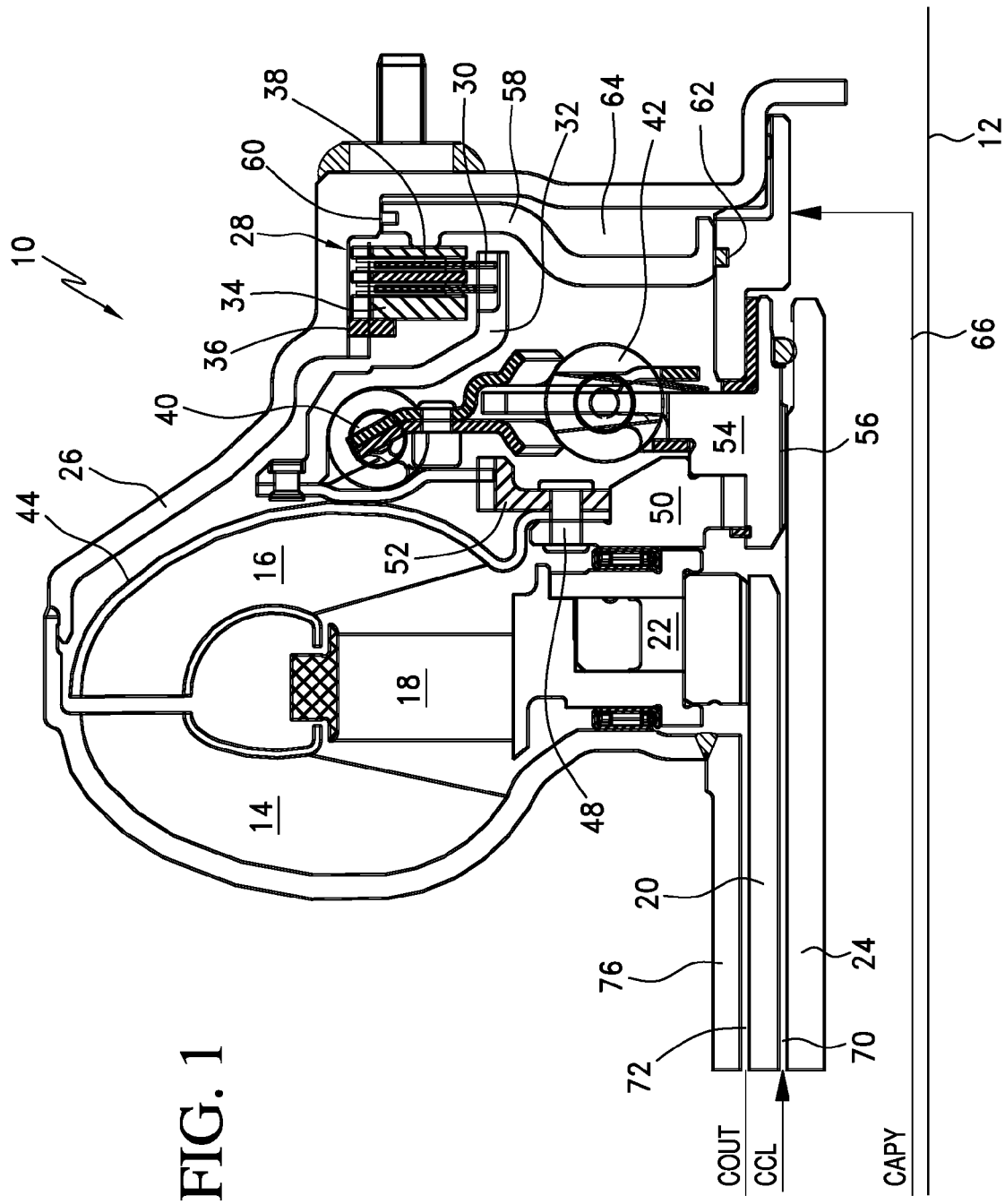
FIG. 1 is a cross sectional side view of a three-pass torque converter to which the control can be applied.

Referring now to the drawings, there is illustrated in FIG. 1 a torque converter 10, which is arranged about a central axis 12 and includes an impeller 14, turbine 16, and stator 18. The impeller, stator and turbine are located in a toroidal chamber that defines a toroidal fluid flow circuit, whereby the impeller is hydrokinetically connected to the turbine. The torque converter impeller 14 is driveably connected to an engine or another power source.

The stator 18 is secured to, and supported for rotation on a stationary stator support shaft 20. An overrunning brake 22 anchors the stator to shaft 20 to prevent rotation of the stator during torque multiplication but allows free rotation at higher speeds when the turbine flow pushes the backside of the stator blades. The turbine 16 is secured to a rotating transmission input shaft 24, which transmits torque to a transmission gear box (not shown). A torque converter housing 26, surrounding the turbine, impeller and stator, is driveably connected to the crankshaft of an internal combustion engine (not shown) or another power source, such as an electric motor.

Located within a torque converter housing 26 is a bypass clutch 28 (sometimes called a lockup clutch) for alternately opening and closing a drive connection between turbine 16 and the impeller 14. Clutch 28 includes a set of friction discs 30, secured by internal splines to, and supported on a clutch hub 32 for rotation with the hub; a blocker plate 34, secured by a snap ring 36 to housing 26; and clutch plates 38, secured by splines to housing 26 for rotation with the housing, each plate interleaved between successive friction discs 30. Hub 32 is secured to compression-spring, torsional dampers 40, 42, which are arranged in series between hub 32 and the transmission input shaft 24.

A turbine shroud 44, connected to each blade of turbine 16, is connected by a series of rivets 48 to a turbine hub 50 and a ring 52, which is driveably connected though a spline to clutch hub 32. The output of damper 42 is driveably connected to a damper hub 54, which is connected by a spline 56 to input shaft 24.

Lockup clutch 28 is actuated by a piston 58, which is supported for axial displacement along axis 12. Piston is sealed at its outer periphery by a dynamic seal 60 to an inner surface of housing 26 and is sealed at its inner periphery by a dynamic seal 62, thereby defining a sealed volume 64 located between piston 58 and housing 26. When volume 64 is pressurized through clutch apply passage 66 (CAPY), piston 58 moves leftward forcing friction discs 30 and clutch plates 38 into mutual frictional contact, thereby engaging bypass clutch 28. When clutch 28 is engaged, the engine and turbine 16 are mechanically interconnected and driveably connected to the transmission input shaft 24. When lockup clutch 28 is disengaged, the turbine 16 and engine are mechanically disconnected, and the turbine is hydrokinetically driven by the impeller 14.

ATF fills the toroidal volume in which the turbine 16, impeller 14 and stator 18 rotate, at converter charge pressure (CCL) through an annular passage 70 between input shaft 24 and stator support 20. ATF exits torque converter 10 at converter discharge pressure (COUT) through passage 72, an annular passage between stator support 20 and a converter drive shaft 76, on which impeller 14 is supported.

Figure 2:
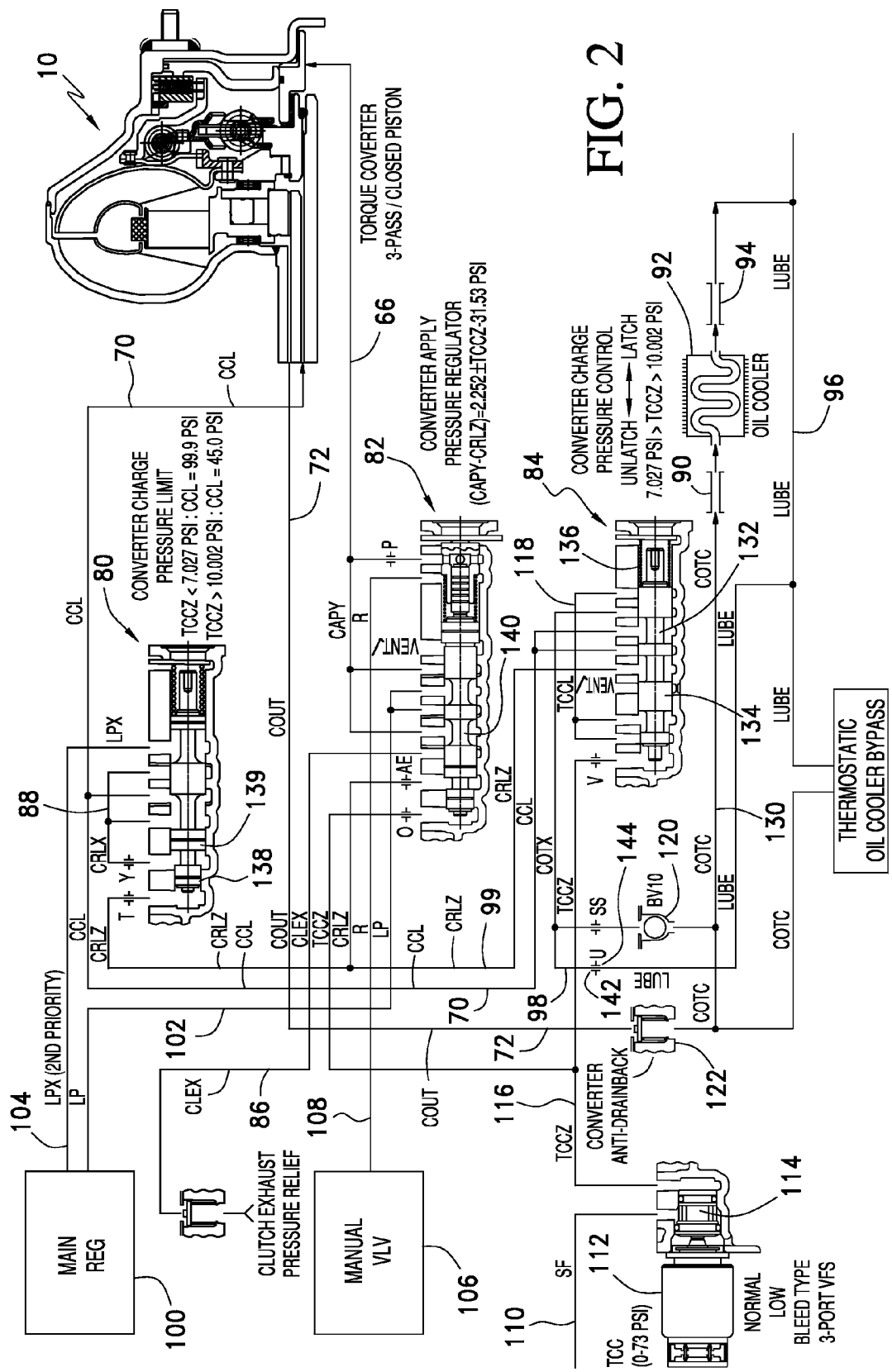
FIG. 2 is schematic diagram of a hydraulic system for controlling operation of a torque converter, such as that shown in FIG. 1.

FIG. 2 illustrates a hydraulic system for controlling converter charge limit pressure (CCL) of the fluid that enters the toroidal chamber of converter 10 through line 70, converter apply pressure (CAPY) that controls converter clutch 28, and fluid exiting the converter (COUT) through line 72.

The torque transmitting capacity of clutch 28 may vary among: (1) a locked condition, in which clutch 28 is applied but may be slipping; (2) a hard locked condition, in which the clutch is applied with zero slip, transmitting full engine torque; (3) a unlocked condition, in which clutch 28 is released and has zero torque capacity; and (4) a modulating condition, in which the clutch is slipping and transmitting a commanded torque equal to or less than engine torque.

The hydraulic system includes a converter charge pressure limit valve 80, which may be a regulator valve or, as shown in FIG. 2, a limit valve having no exhaust port.

A converter apply pressure regulator valve 82, a differential regulator valve that regulates pressure and has a second feedback pressure (CRLZ), supplied through a converter release latch orifice AE.

A converter charge pressure control latch valve 84 has only two positions, between which it shuttles to hold or latch in either of two pressure magnitudes, which are supplied to valve 82.

Clutch exhaust (CLEX) line 86 keeps oil exhausted out of clutch 28 from draining out, keeping circuit fluid filled for improved consistency and response. Converter-out-to cooler (COTC) flow in line 72 exits the transmission case at 90 to transmission oil cooler 92, returns to the transmission case at 94 after exiting the cooler, and the cooled ATF flows to a transmission lube circuit 96, through which bearings, shafts, gears and other mechanical components of the transmission are lubricated.

Converter-out-to-exhaust (COTX) line 98 carries ATF to the lube circuit 96.

Converter release latch exhaust pressure (CRLX) is carried in line 88 between ports of valve 80. Converter release latch orifice pressure (CRLZ) is generated by converter charge pressure control latch valve 84 and is carried in orifice line 99 between valves 80 and 82.

Line Pressure (LP), a first priority output of main regulator 100, is carried in line 102 to valve 82. Line pressure exhaust (LPX), a second priority output of main regulator 100, is carried in line 104 to valve 80. R: Reverse pressure (R), an output from manual valve 106, is carried in line 108 to valve 82.

Solenoid feed (SF), a regulated pressure carried in line 110, is supplied to solenoid 112, which controls TCC valve 114. The output of solenoid 114 is torque converter clutch control pressure (TCCZ) carried in orifice line 116 to latch valve 84 and valve 82. Torque converter clutch control pressure (TCCL), carried in line 118, is the latched pressure output produced by latch valve 84.

Ball valve (BV10) opens and closes in response to differential pressure caused by COTX and COTC across valve 120. A converter anti-drain back valve 122 prevents ATF from draining out of converter 10 through line 72, when engine of off.

When clutch 28 is unlocked, solenoid control pressure TCCZ is less than about 7.3 psi, fluid at LPX pressure is supplied to valve 80, and CRLZ pressure at the end of the spool 138 of valve 80 is zero as a result of its being vented at the VENT port of latch valve 84. These pressures and the spring of valve 80 move spool 138 leftward from the position shown in FIG. 2, thereby opening a connection between LPX pressure and the CRLX passages 88 of valve 80. The feedback CRLX pressure on land 139 regulates CCL pressure to 100 psi in CCL line 70, which is connected by valve 80 to the CRLX passage 88.

Therefore, while clutch 28 is unlocked, torque converter 10 is supplied with CCL pressure at about 100 psi from the converter charge pressure limit valve 80. Flow through the converter 10 is a function of CCL pressure. While clutch 28 is unlocked, oil exiting converter 10 through line 72 flows directly to cooler 92 and the lube circuit 96. A thermostatic control valve will bypass the cooler 92, when oil temperature is below 180 deg F., allowing the transmission to warm up faster, thereby reducing viscous drag, improving the transmissions efficiency. This bypass occurs by creating a lower resistance path between circuits COTC 130 and LUBE 96. Converter apply pressure regulator 82 is not used while clutch 28 is unlocked, and is held off by exhausting CRLZ circuit through the converter charge pressure control valve 84. Also, when the vehicle operator moves the gear selector to the Reverse position, R pressure in line 108 is fed to the converter apply pressure regulator 82 as an additional force to hold valve 82 off. Although this action is not necessary, it comes without added cost or complexity. Check ball (BV10) 120 keeps oil from back flowing from COTC line 130 to COTX line 98.

When clutch 28 is locked, hard locked or modulating, converter charge pressure control valve 84 must latch. Valve 84 is unlatched when TCCZ pressure is less than about 7.0 psi. Valve 84 is latched when TCCZ pressure is greater than about 10.0 psi. The magnitude of electric current supplied to solenoid 112 changes the magnitude of TCCZ pressure produced by valve 114 in response to the current.

To latch valve 84, current supplied to solenoid 112 is increased toward 850 milliamps, which increases pressure TCCZ in line 116 to greater than the reference pressure, 10.0 psi, at which valve 84 latches. As TCCZ pressure increases toward 10 psi, the spool 132 strokes rightward opening a connection between TCCZ line 116 and TCCL line 118, thereby adding to the pressure force on land 134, which force opposes the force of spring 136.

When valve 84 latches, CCL pressure line 70 is opened to CRLZ line 99, and CCL pressure is sent to an addition pressure area on land 138 of the converter charge pressure limit valve 80, causing valve 80 to reduce CCL pressure in line 70 to about 45 psi. This pressure reduction occurs because converter 10 does not need as much pressure while clutch 28 is locked or modulating, and because increasing the torque capacity of clutch 28 by leftward movement of the converter clutch piston 58 is facilitated by low CCL pressure in the toroidal chamber of converter 10.

When valve 84 latches, CCL pressure is communicated to land 138 of the converter charge pressure limit valve 80 via CRLZ line 99 and to one of two feedback ports of valve 82, causing the spool 140 of valve 82 to regulate converter apply pressure (CAPY), which is carried in line 66 to the converter clutch 28. The pressure force effects of the two feedback pressures on valve 82, CRLZ pressure at 45.0 psi in line 99 and variable TCCZ pressure greater than 10.0 psi in line 116 regulate CAPY pressure, which is carried in line 66 to the converter clutch 28.

When valve 84 latches, the rightward stoking of its spool 132 connects CCL pressure in line 70 to cooler 92 through the COTX circuit line 98, which is used to supplement flow to the COTC circuit 98 and LUBE circuit 96, since circuits 98 and 96 will receive less oil from the COUT circuit 72 after valve 84 latches and CCL pressure drops to 45 psi. Flow in COUT circuit 72 is lower because the converter is now being fed oil at 45 psi instead of 100 psi. The diameter of orifices U 142 and SS 144 are sized to produce the correct flow rates in COTC circuit 130 and LUBE circuit 96 during locked and modulating operation of bypass clutch 28.

In accordance with the provisions of the patent statutes, the preferred embodiment has been described. However, it should be noted that the alternate embodiments can be practiced otherwise than as specifically illustrated and described.

The invention claimed is:

1. A control system for a torque converter and bypass clutch, comprising:
    a control pressure source;
    a line exhaust pressure source;
    a latch valve that is unlatched when control pressure is less than a reference, and latched when control pressure is greater than a second reference;
    a limit valve using line exhaust pressure to maintain a first converter charge pressure when the latch valve is unlatched and a lower pressure when the latch valve is latched.

2. The system of claim 1 wherein the limit valve limits converter charge pressure entering a chamber of the torque converter to the first converter charge pressure when the bypass clutch is unlocked.

3. The system of claim 1 wherein the limit valve limits converter charge pressure entering a chamber of the torque converter to the lower pressure when the bypass clutch is locked, hard locked or modulating.

4. The system of claim 1, further comprising a regulator valve, and wherein a pressure regulated by the regulator valve is zero when the clutch is unlocked.

5. The system of claim 4 wherein:
    the latch valve, when latched, connects converter charge pressure to the regulator valve; and
    the variable magnitude of control pressure and the magnitude of converter charge pressure greater than the second reference are feedback pressures applied to first and second control lands of the regulator valve.

6. The system of claim 4 wherein:
    the latch valve, when latched, connects converter charge pressure to the regulator valve; and
    a variable magnitude of control pressure and the magnitude of converter charge pressure greater than the second reference are feedback pressures applied to first and second control lands of the regulator valve.

7. The system of claim 1, further comprising a regulator valve, and wherein the regulator valve actuates the bypass clutch and changes a torque capacity of the clutch.

8. The system of claim 1 wherein the system further includes:
    an oil cooler, and wherein
    the latch valve, when latched, connects converter charge pressure to the oil cooler.

9. The system of claim 1 wherein the system further includes a lube circuit, and the latch valve directs fluid into the oil cooler and away from a chamber of the torque converter when the latch valve is latched.

10. The system of claim 1 wherein:
    the latch valve, when unlatched, vents a pressure that is connected to the limit valve.

11. The system of claim 1 wherein:
    the latch valve, when latched, connects converter charge pressure to the limit valve; and
    the limit valve, when latched, uses converter charge pressure and line exhaust pressure to produce the lower pressure.

12. The system of claim 1, further comprising:
a line pressure source;
a regulator valve that uses line pressure to control pressure in the bypass clutch in response to a variable magnitude of control pressure and a magnitude of converter charge pressure greater than the second reference when the latch valve is latched.

13. A control system for a torque converter and bypass clutch, comprising:
a source of variable control pressure;
a line pressure source;
a latch valve that is unlatched when control pressure is less than a reference, and latched when control pressure is greater than a second reference;
a regulator valve that uses line pressure to control pressure in the bypass clutch in response to a variable magnitude of control pressure and a magnitude of converter charge pressure greater than the second reference when the latch valve is latched.

14. The system of claim 13, further comprising:
a limit valve that maintains a first converter charge pressure in a chamber of the torque converter when the clutch is unlocked.

15. The system of claim 14, further comprising:
a limit valve that limits a second converter charge pressure in a chamber of the torque converter to a pressure lower than the first converter charge pressure when the clutch is locked, hard locked or modulating.

16. The system of claim 14 wherein:
the latch valve, when latched, connects converter charge pressure to the limit valve; and
the limit valve, when latched, uses converter charge pressure and line exhaust pressure to produce the lower pressure.

17. The system of claim 13 wherein the system further includes:
an oil cooler, and wherein
the latch valve, when latched, connects converter charge pressure to the oil cooler.

18. The system of claim 13 wherein the system further includes a lube circuit, and the latch valve directs fluid into the oil cooler and away from a chamber of the torque converter when the latch valve is latched.

19. The system of claim 13, further comprising:
a limit valve that uses the line exhaust pressure to produce a constant first converter charge pressure when the latch valve is unlatched, and to produce a lower pressure when the latch valve is latched.

20. The system of claim 13, wherein:
the regulator valve uses line pressure to control pressure in the bypass clutch in response to a variable magnitude of control pressure and a magnitude of converter charge pressure greater than the second reference when the latch valve is latched.

* * * * *